(No Model.)  2 Sheets—Sheet 1.

W. WHEELER
HOLEPHOTES FOR LIGHTING DWELLINGS.

No. 247,230. Patented Sept. 20, 1881.

Witnesses
S. N. Piper
E. B. Pratt

Inventor
William Wheeler
by R. H. Eddy att'y (No Model.) 2 Sheets—Sheet 2.
W. WHEELER.
HOLEPHOTES FOR LIGHTING DWELLINGS.
No. 247,230. Patented Sept. 20, 1881.

Witnesses.
S. N. Piper.
C. R. Pratt.

Inventor.
William Wheeler.
by R. H. Eddy atty.

UNITED STATES PATENT OFFICE.

WILLIAM WHEELER, OF CONCORD, MASSACHUSETTS.

HOLOPHOTE FOR LIGHTING DWELLINGS.

SPECIFICATION forming part of Letters Patent No. 247,230, dated September 20, 1881.

Application filed May 23, 1881. (No model.)

*To all whom it may concern:*

Be it known that I, WILLIAM WHEELER, of Concord, of the county of Middlesex and State of Massachusetts, have invented certain new and useful Improvements in Holophotes or Holophotal Apparatus for Lighting Dwellings, or for other illuminating purposes; and I do hereby declare the following to be a description of the invention, reference being had to the accompanying drawings, hereinafter explained.

This invention consists in means for collecting the entire sphere of diverging rays into one beam of parallel rays. The said beam of parallel rays is necessarily of the same diameter as the aperture or mouth of the said holophote. By my invention a beam of parallel, or nearly parallel, rays may be produced of any desired diameter less than that of the principal aperture or mouth of the holophote. The apparatus covered by my invention may therefore be termed a "condensing-holophote," the nature of my said invention being defined in the claims hereinafter made.

Figure 1:
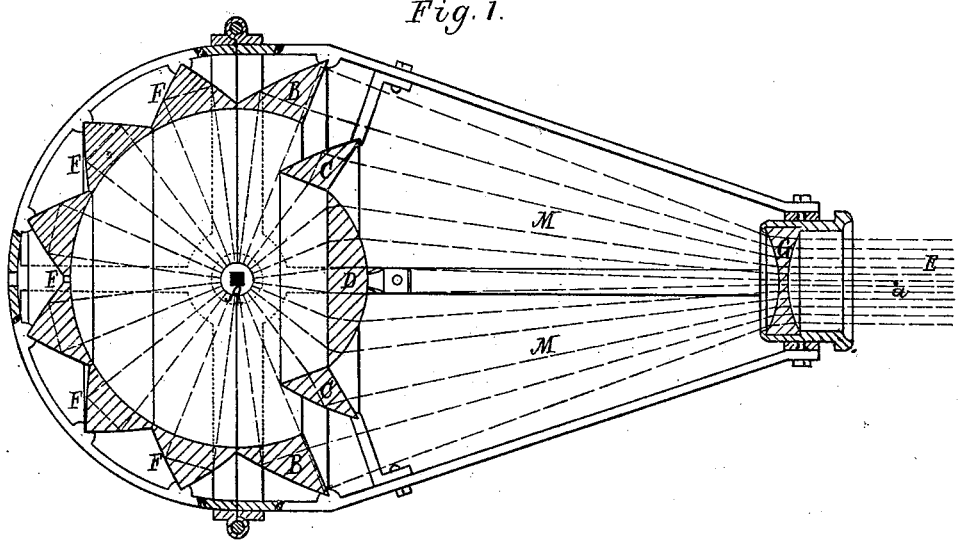
Figure 2:
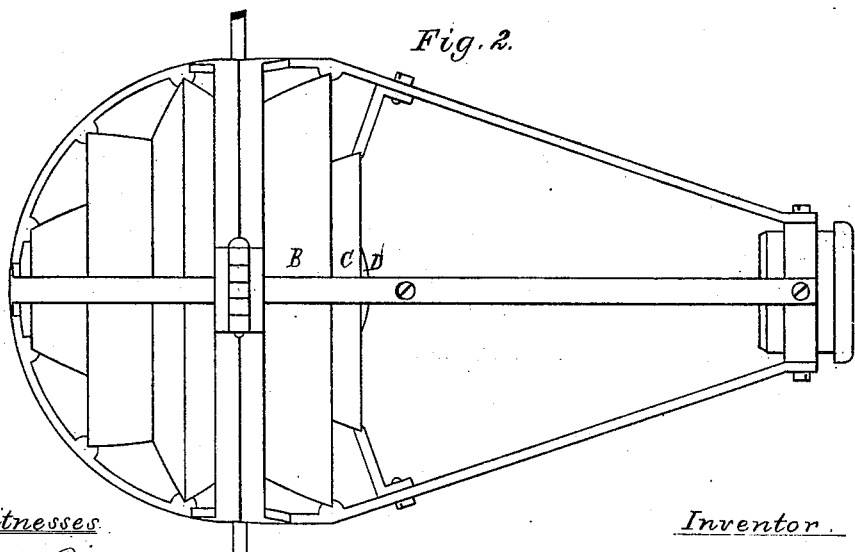
Figure 3:
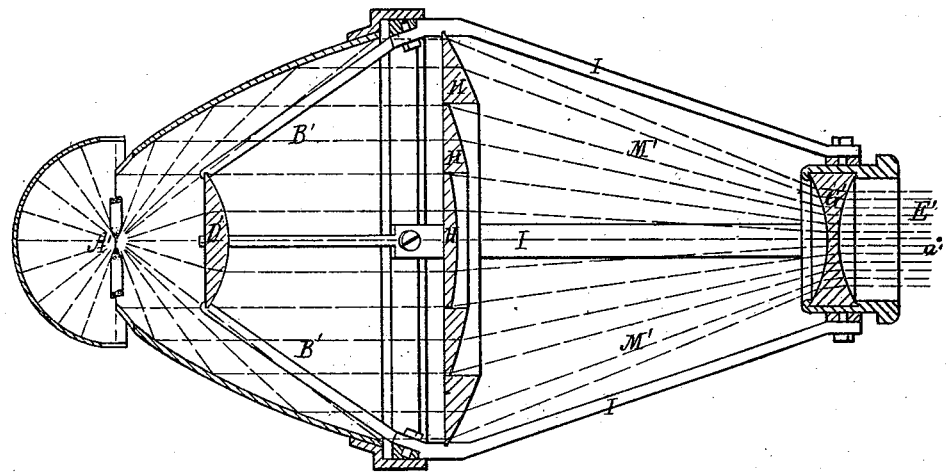
Figure 4:
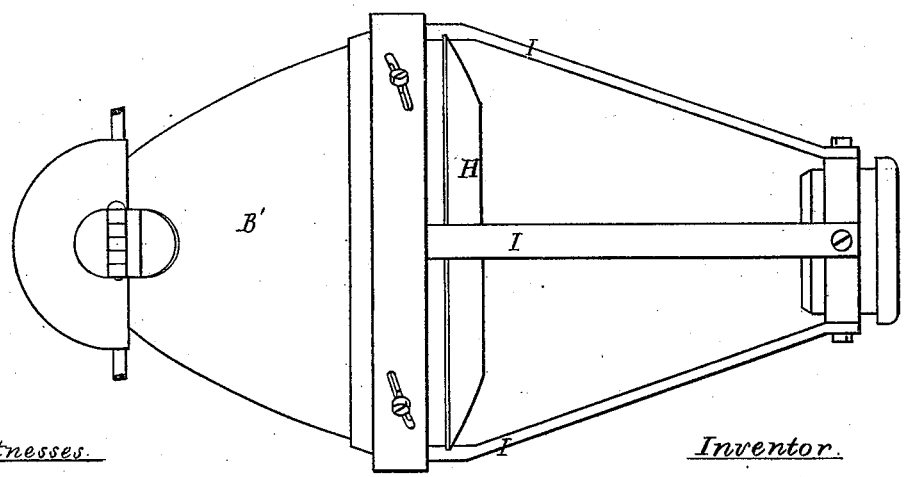

Figure 1 exhibits a horizontal section of my dioptric condensing-holophote, and Fig. 2 a side elevation of the same. Figs. 3 and 4 represent similar views of a catoptric condensing-holophote, to be hereinafter explained.

A in said Figs. 1 and 2 denotes the light source and center, said light being derived from the electric arc or any other suitable means. The various paths of the light-rays emanating from such center and acted upon by the different parts of the holophote are represented by the broken lines in Fig. 1. The front half of the rays diverging from the source A is operated upon not only by total-reflection prisms B B and C C, which are annular or curvilinear in their own vertical plane, but by the convex lens D, in such manner as to cause all of said rays to converge toward a common secondary focus at or near the point $a$. The rays, proceeding backward, fall upon curvilinear or annular glass prisms F F F, which produce two total reflections upon each ray and cause it to pass back to and through the arc at A, so as to increase the heat and light power thereof, and also to fall ultimately, in the proper direction, upon the dioptric holophote in front, the whole of the light proceeding from the center being converged toward the point $a$ by the means of said very small number and perfect kind of optical appliances. At a suitable distance from the point $a$ (such distance depending upon the required size of the condensed beam E and the intensity of the heat developed in the formation thereof by the condensation of the rays) the pencil M M of converging rays is intercepted and acted upon by the double-concave lens G, so as to produce the condensed beam of parallel, or nearly parallel, rays E.

My invention, as thus described, consists in a dioptric holophote formed, substantially as set forth, to produce a primary pencil of converging instead of parallel rays, and provided with a concave lens, by which said converging rays are made parallel in a beam of less diameter than the principal aperture of said holophote.

Fig. 3 represents a vertical section of my catoptric condensing-holophote, with paraboloidal reflector, and Fig. 4 a side elevation of the same.

A' denotes the light source and center, said light being derived from the electric arc or any suitable source. The paths of the rays of light emanating therefrom and variously acted upon by the different parts of the holophote are represented by the broken lines in Fig. 3.

As shown in Figs. 3 and 4, my invention consists in the combination of the parabolic reflector B', the convex parallelizing-lens D', the converging or condensing lenses H H H, and the double-concave parallelizing-lens G', the latter being adjustably mounted as shown—that is, in a suitable frame.

Since the primary pencil of rays emanating from a paraboloidal holophote must necessarily be parallel, in order to reduce the size and increase the intensity of the beam formed thereby, it first becomes necessary to cause said rays to converge toward a point or secondary focus, as at $a'$, which I do in this case by means of the said lens H H H, mounted in the frame I I I. The converging pencil of rays M' M' formed thereby is intercepted and acted upon by the double-concave lens G', so as to produce the condensed beam of parallel and nearly parallel rays E'.

By means of this combination simple parabolic reflectors made for common uses—such as head-lights, &c.—may be readily adapted for use in condensing-holophotes.

Having thus described my invention, what I claim as new, and desire to secure by Letters Patent, is—

1. In a dioptric holophote, substantially as described, formed to produce a primary pencil of converging rays, and provided with a parallelizing-lens to form a beam of light of reduced size, as set forth, the total-reflection prisms B B and C C and the convex lens D, arranged and adapted essentially as set forth.

2. A catoptric holophote, substantially as described, formed to produce a primary pencil of parallel rays, and provided with a converging-lens and a parallelizing-lens to form a beam of condensed light of reduced size, all essentially as set forth, such catoptric condensing-holophote consisting of the parabolic reflector B' and the convex lenses D' and H H H, all being essentially as set forth.

WILLIAM WHEELER.

Witnesses:
R. H. EDDY,
E. B. PRATT